(12) United States Patent
Ota et al.

(10) Patent No.: US 9,017,844 B2
(45) Date of Patent: Apr. 28, 2015

(54) ELECTRIC APPARATUS SYSTEMS

(75) Inventors: Tomoyuki Ota, Anjo (JP); Tomonobu Nashimoto, Anjo (JP)

(73) Assignee: Makita Corporation, Anjo-Shi (JP)

( * ) Notice: Subject to any disclaimer, the term of this patent is extended or adjusted under 35 U.S.C. 154(b) by 16 days.

(21) Appl. No.: 13/093,528

(22) Filed: Apr. 25, 2011

(65) Prior Publication Data

US 2011/0269006 A1 Nov. 3, 2011

(30) Foreign Application Priority Data

Apr. 28, 2010 (JP) ................................. 2010-103750

(51) Int. Cl.
*H01M 2/10* (2006.01)

(52) U.S. Cl.
CPC .......... *H01M 2/1022* (2013.01); *H01M 2/1055* (2013.01)

(58) Field of Classification Search
CPC ........................... H01M 2/1022; H01M 2/1055
USPC ................. 429/100, 99, 97, 96; D13/120
See application file for complete search history.

(56) References Cited

U.S. PATENT DOCUMENTS

| | | | | | |
|---|---|---|---|---|---|
| 4,183,133 | A | * | 1/1980 | Abbott | 29/275 |
| 5,149,602 | A | * | 9/1992 | Savovic et al. | 429/96 |
| 5,736,271 | A | * | 4/1998 | Cisar et al. | 429/96 |
| 5,929,597 | A | * | 7/1999 | Pfeifer et al. | 320/107 |
| 6,171,138 | B1 | * | 1/2001 | Lefebvre et al. | 439/500 |
| 6,409,042 | B1 | * | 6/2002 | Hirano et al. | 220/812 |
| 6,554,765 | B1 | * | 4/2003 | Yarush et al. | 600/132 |
| 2001/0030850 | A1 | * | 10/2001 | Ditzik | 361/683 |
| 2003/0085621 | A1 | * | 5/2003 | Potega | 307/18 |
| 2004/0228622 | A1 | * | 11/2004 | Schedivy | 386/125 |
| 2004/0252966 | A1 | * | 12/2004 | Holloway et al. | 386/46 |
| 2006/0164032 | A1 | * | 7/2006 | Johnson et al. | 320/103 |

FOREIGN PATENT DOCUMENTS

| | | | |
|---|---|---|---|
| JP | S-53-156115 | 5/1977 | |
| JP | 10-222258 A | 8/1998 | |
| JP | 11-195407 A | 7/1999 | |
| JP | 2000-092726 A | 3/2000 | |
| JP | 2004-220440 A | 8/2004 | |
| JP | A-2007-511931 | 5/2007 | |
| WO | WO 0036669 | * 12/1999 | H01M 2/10 |
| WO | WO 2005/041428 A1 | 5/2005 | |

OTHER PUBLICATIONS

Websters New World Thesaurus 1985, Pocket Books, New York Latch Definition p. 231 ISBN: 0-671-51983-2.*
Coaxial Power Connector Wikipedia pp. 1-14 printed Oct. 5, 2014 {http://en.wikipedia.org/wiki/Coaxial_power_connector}

(Continued)

*Primary Examiner* — Patrick Ryan
*Assistant Examiner* — Aaron Greso
(74) *Attorney, Agent, or Firm* — Oliff PLC

(57) ABSTRACT

An electric apparatus system includes a tool battery usable as a power source for a power tool, an electric apparatus excluding a power tool, and a battery case capable of receiving the tool battery. The battery case is disposed on one side of the electric apparatus, so that the electric apparatus is stabilized in position by the battery case. The electric apparatus and the battery case are mechanically and electrically connected to each other.

27 Claims, 8 Drawing Sheets

(56) References Cited

OTHER PUBLICATIONS

Wayback date Jun. 17, 2008, { http://web.archive.org/web/20080401000000*/http://en.wikipedia.org/wiki/Coaxial_power_connector}.*

Japanese Office Action for Application No. 2010-103750 mailed Oct. 29, 2013 (with translation).
Office Action dated May 13, 2014 issued in Japanese Patent Application No. 2010-103750 (W/Translation).

* cited by examiner

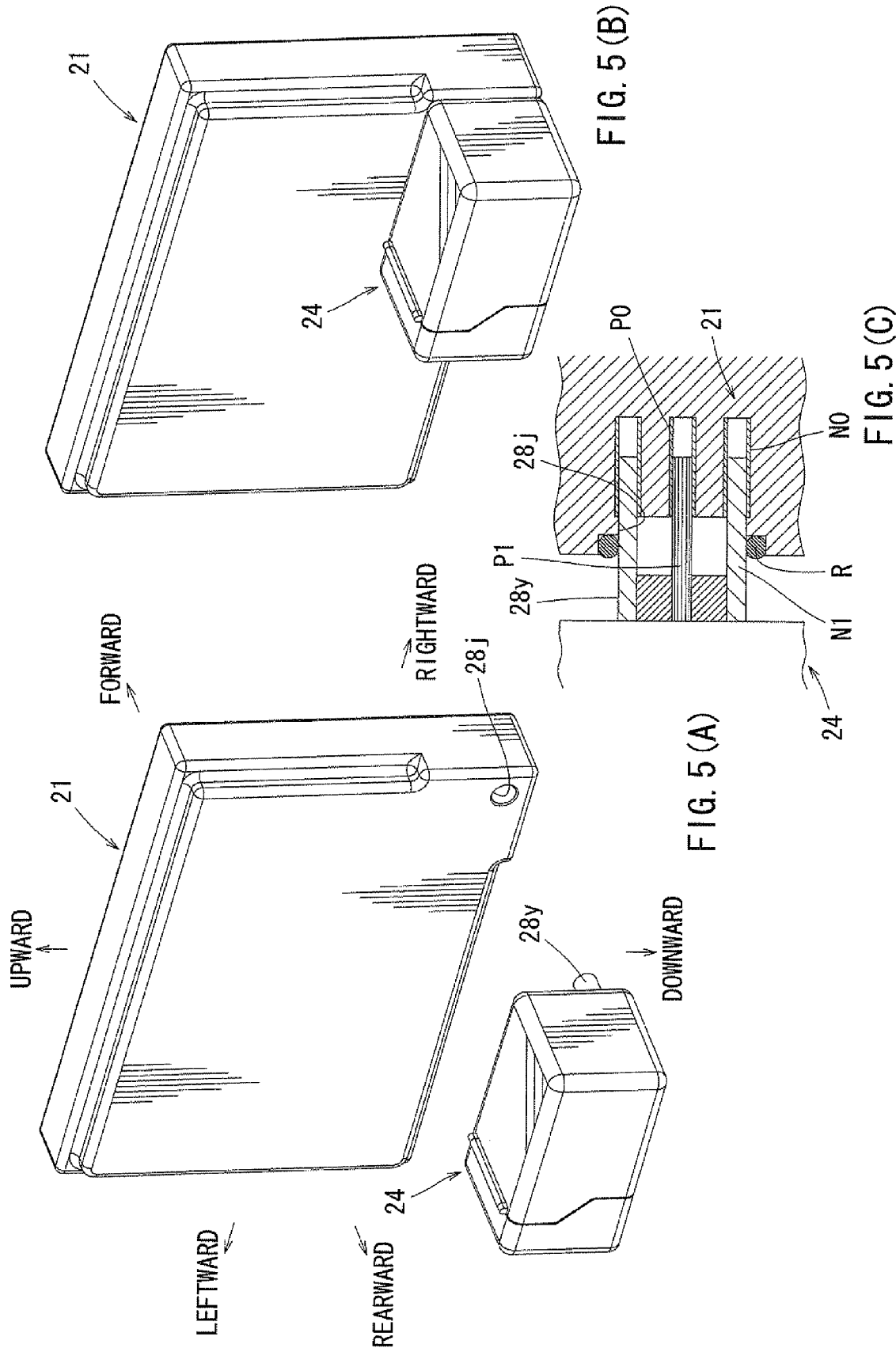

ELECTRIC APPARATUS SYSTEMS

This application claims priority to Japanese patent application serial number 2010-103750, the contents of which are incorporated herein by reference.

BACKGROUND OF THE INVENTION

1. Field of the Invention

The present invention relates to electric apparatus systems that include an electric apparatus excluding a power tool, and a tool battery used as a power source for a power tool.

2. Description of the Related Art

PCT International Publication No. WO2005/041428 (Japanese Laid-Open Patent Publication No. 2007-511931) teaches an audio power unit capable of withstanding abusive treatment and usable for either an AC power source and a DC power source (battery). This unit has a cubic or rectangular housing in which all of an audio unit, a power source device and a battery, etc., are stored. The housing is surrounded by a rectangular frame including rods assembled together from the front, rear, left, right, upper and lower sides, so that an external force can be withstood by the rods. In addition, the rods assembled into the frame serves to enable the audio unit to be placed in stable on an installation surface.

However, because the audio power unit of the above publication is configured to store all of the audio unit, the power source device and the battery, etc., the housing has a large size. In addition, because the housing is surrounded by the rods assembled into the frame, the audio power unit inevitably has a large size.

Therefore, there is a need in the art for an electric apparatus system that includes an electric apparatus and a tool battery and can be configured to be small in size.

SUMMARY OF THE INVENTION

According to the present teaching, an electric apparatus system includes a tool battery usable as a power source for a power tool, an electric apparatus excluding a power tool, and a battery case capable of receiving the tool battery. The battery case is disposed on one side of the electric apparatus, so that the electric apparatus is stabilized in position by the battery case. The electric apparatus and the battery case are mechanically and electrically connected to each other.

BRIEF DESCRIPTION OF THE DRAWINGS

FIG. 5(A) is a perspective view of an electric apparatus system configured as a portable television system according to a second example;

FIG. 5(B) is an exploded perspective view of the portable television system shown in FIG. 5(A);

FIG. 5(C) is a plan view of a connecting portion between a portable television and a battery case with a part shown in cross section.

DETAILED DESCRIPTION OF THE INVENTION

Figure 1:
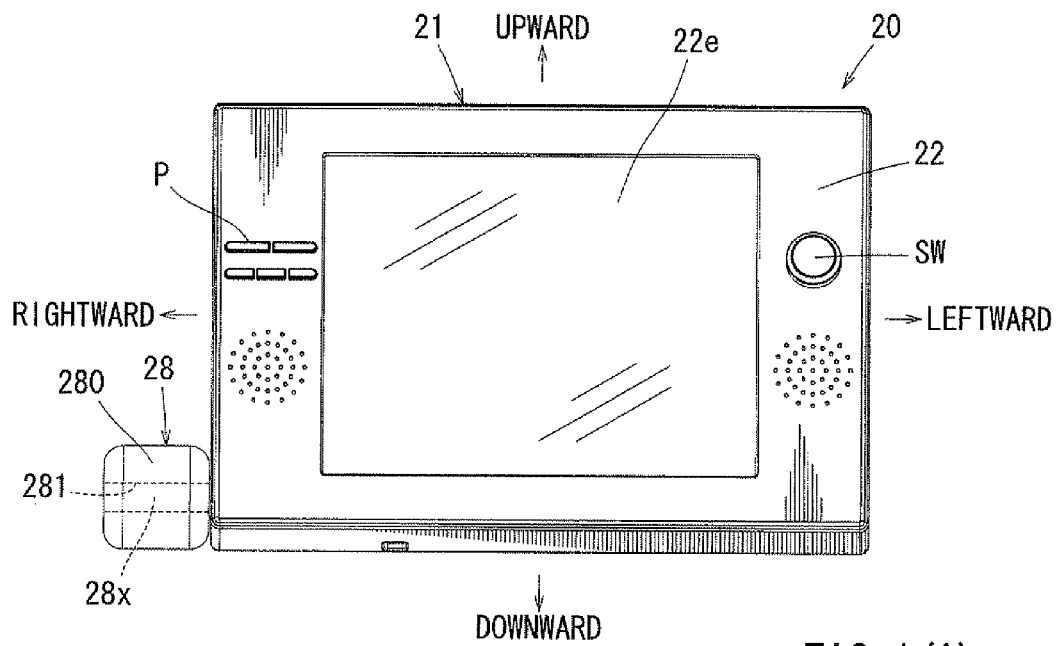
FIGS. 1(A) and 1(B) are a front view and a right side view, respectively, of an electric apparatus system configured as a portable television system according to a first example.
FIG. 1(C) is a right side view similar to FIG. 1(B) but showing a television in an inclined position.
Figure 1:
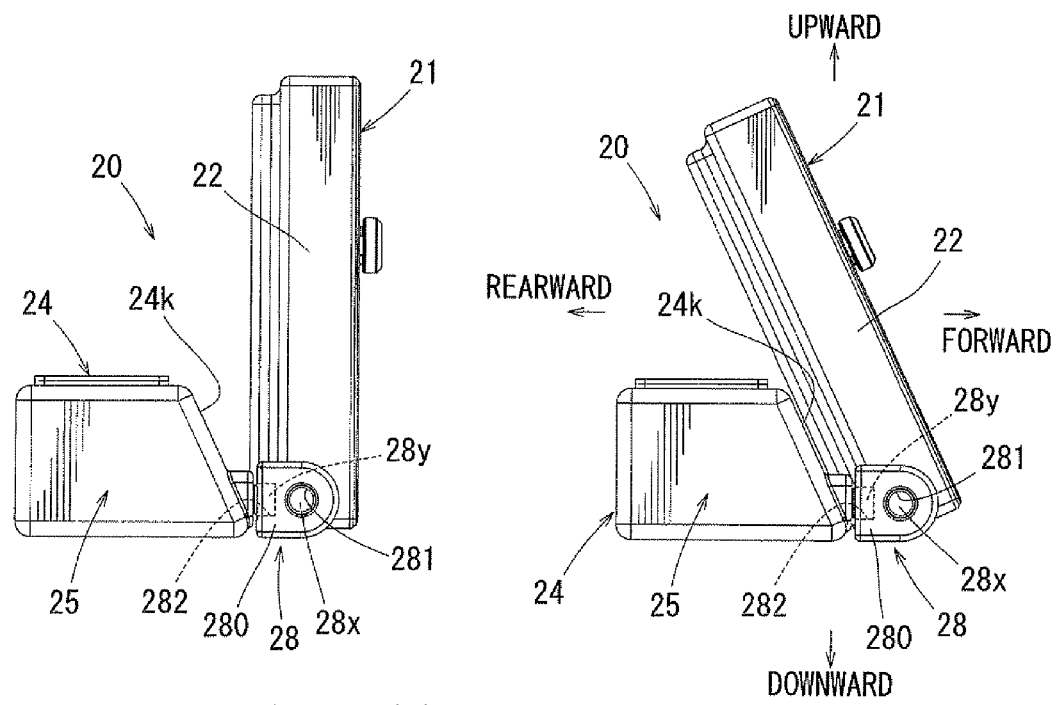

Each of the additional features and teachings disclosed above and below may be utilized separately or in conjunction with other features and teachings to provide improved electric apparatus systems. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, an electric apparatus system includes a tool battery usable as a power source for a power tool, and an electric apparatus excluding a power tool and including an electric apparatus and a battery case capable of receiving the tool battery. The battery case is disposed on one side, e.g., a rear side or a left or right side, of the electric apparatus. The battery case has a connecting section electrically connected to the electric apparatus and is disposed within the battery case. The terminal section can be electrically connected to and disconnected from the tool battery.

Because the battery case for receiving the tool battery has the connecting section that can be electrically connected to and disconnected from the tool battery, it is possible to electrically and mechanically connect the tool battery to the electric apparatus. Therefore, it is possible to use the tool battery as a power source for the electric apparatus.

In addition, by disposing the battery case on the rear side or the left or right side of the electric apparatus, the battery case can serve as a support for supporting the electric apparatus or as a stopper for preventing the electric apparatus from tilting downward. Therefore, in comparison with the known arrangement that supports the housing by a plurality of rods assembled into a rectangular frame, it is possible to support the electric apparatus by a simple construction and to eventually minimize the size of the electric apparatus system.

The battery case and the electric apparatus may be configured separately from each other and are connected to each other by a connection mechanism.

The electric apparatus may be a reproducing device for reproducing data stored in a recording medium and having an insertion portion at a rear surface for inserting the recording media therein. The battery case may be rotatably connected to the reproducing device by the connection mechanism. With this arrangement, even in the event that the battery case is positioned to be opposed to the insertion portion of the reproducing device, it is possible to avoid hindrance of the operation for inserting and removing the recording media by pivoting the battery case to a suitable position.

The electric apparatus system may further include a lock mechanism configured to prevent rotation of the battery case relative to the reproducing device when the battery case is positioned at a set position relative to the reproducing device. With this arrangement, because the position of the battery case is locked relative to the reproducing device, it is possible to support the reproducing device in stable.

In the case that the electric apparatus is an image display device having a screen, the battery case may be configured to support the image display device in the state that the screen is inclined relative to a vertical direction. With this arrangement, the user can easily view the screen.

The connection mechanism for connecting between the battery case and the electric apparatus may include a round pin provided on one of the battery case and the electric apparatus and a circular recess formed in the other of the battery case and the electric apparatus and rotatably receiving the round pin. A seal member may be attached to an inner circumference of the circular recess for sealing between the round pin and the inner circumference of the circular recess. The round pin may serve as power supply terminals and may define a center of rotation of the battery case. With this arrangement, it is not necessary to wire electric lines to extend through or around the connection mechanism. Therefore, no countermeasure is necessary for avoiding potential breakage of the electric lines.

The battery case may include a case body, a lid and a seal member. The case body has a battery insertion opening. The lid can open and close the battery insertion opening of the case body. The seal member can seal a joint portion between the case body and the lid. Therefore, it is possible to improve the waterproof property of the battery case.

The battery case may be configured as a container having a battery insertion opening. The tool battery may include an insert portion capable of inserting into the battery case via the battery insertion opening, a lid capable of opening and closing the battery insertion opening, and a hook portion provided at the lid and capable of engaging with and disengaging from a hook receiving portion provided at the battery case. A seal member may be attached within the battery insertion opening for sealing between the battery case and the lid of the tool battery.

Various Examples will now be described with reference to the drawings. Each of the electric apparatus systems of the examples includes an electric apparatus excluding a power tool, and a tool battery used as a power source of a power tool. In each of the first to third examples shown in FIGS. 1(A), 1(B) and 1(C) to FIG. 7, a portable television is shown as an example of the electric apparatus. In a fourth example shown in FIGS. 8(A) and 8(B), a radio is shown as an example of the electric apparatus.

FIRST EXAMPLE

Referring to FIGS. 1(A), 1(B), 1(C), FIGS. 2(A), 2(B), FIG. 3 and FIGS. 4(A), 4(B) and 4(C), there is shown a portable television system 10 including a portable television unit 20 and a tool battery 30.

<Portable Television>

The portable television unit 20 includes a television device 21 having a built-in DVD player, a battery case 24, a connecting mechanism 28 rotatably connecting the portable television unit 20 and the battery case 24 to each other, and a rotation lock mechanism 29.

Figure 2A:
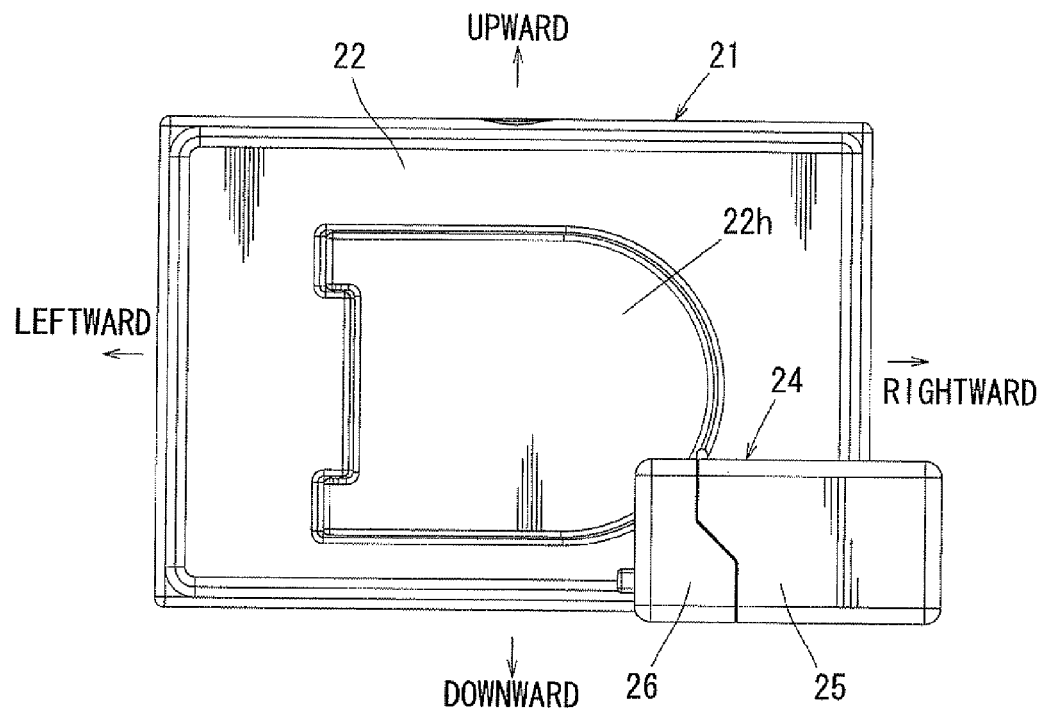
FIG. 2(A) is a rear view of the portable television system.
Figure 2B:
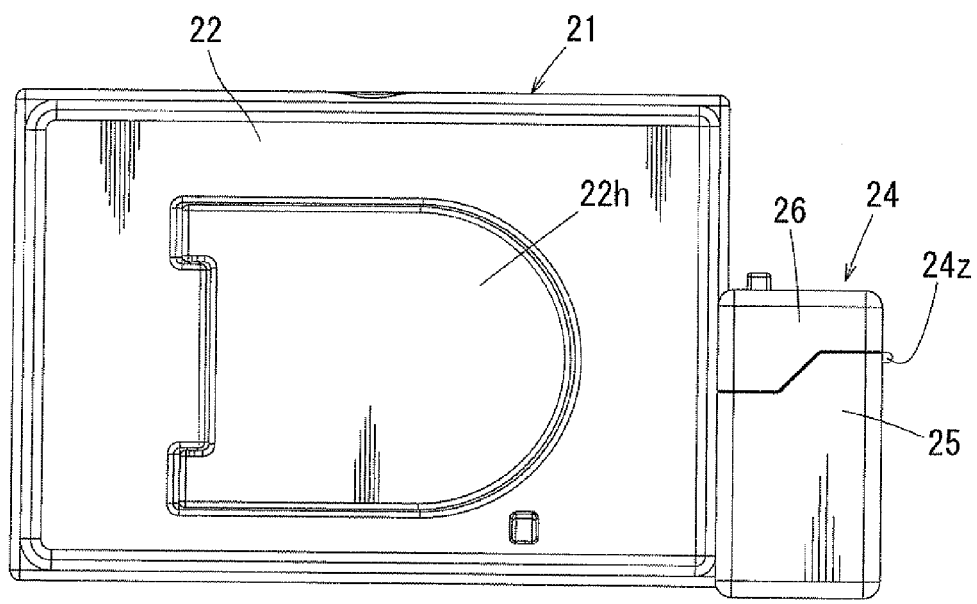
FIG. 2(B) is a rear view similar to FIG. 2(A) but showing a battery case pivoted to a vertical position.

The television device 21 has a thin rectangular housing 22. As shown in FIG. 1(A), an image display 22e is provided centrally of the front surface portion of the housing 22. In addition, at the front surface portion of the housing 22, a power switch SW and an operation panel P are provided on the right side and the left side of the image display 22e, respectively. Further, as shown in FIGS. 2(A) and 2(B), an insertion portion 22h for inserting a recording medium, such as a DVD disk, is provided centrally of the rear surface portion of the housing 22.

<Battery Case Portion>

The battery case 24 of the portable television unit 20 has a rectangular tubular configuration. As will be described later, the battery case 24 can rotate relative to the television device 21 in a direction along the rear surface portion of the television device 21 and also in a direction perpendicular to the rear surface portion of the television device 21 by the connecting mechanism 28. When the battery case 24 is oriented horizontally as shown in FIG. 2(A), the television device 21 can be supported from the rear side by the battery case 24. On the other hand, when the battery case 24 is oriented vertically as shown in FIG. 2(B), the battery case 24 is positioned away from the insertion portion 22h provided at the rear surface portion of the television device 21.

As shown in FIGS. 1(A) and 1(B), the battery case 24 has a substantially trapezoidal configuration in a side view when the battery case 24 is at the horizontally oriented position. Thus, the battery case 24 has an inclined surface 24k that can support the television device 21 when the television device 21 is inclined rearwardly as shown in FIG. 2(B).

Figure 3:
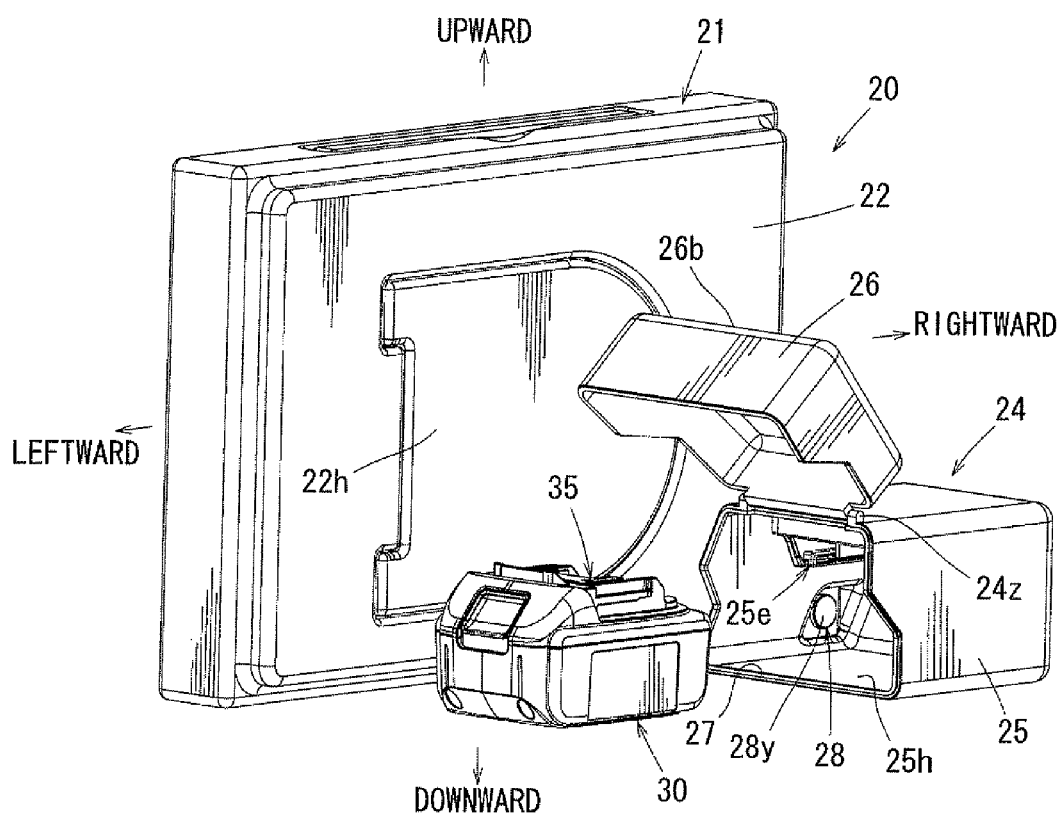
FIG. 3 is a perspective view of the portable television system as viewed from a rear side.

As shown in FIG. 3, the battery case 24 includes a case body 25 and a lid 26. The case body 25 has a battery insertion opening 25h at its one end. The lid 26 can be mounted to and removed from the case body 25 for closing and opening the battery insertion opening 25h. The lid 26 is vertically pivotally connected to the case body 25 via a hinge mechanism 24z that is provided at a position proximal to the upper edge of the battery insertion opening 25h of the case body 25. Therefore, the battery insertion opening 25h of the case body 25 can be opened by pivoting the lid 26 upward when the battery case 24 is at the horizontally oriented position. A seal member 27 is attached to the case body 25 at the inner circumference of the battery insertion opening 25h for sealing a clearance that may be formed between the lid 26 and the case body 25 when the battery insertion opening 25h is closed by the lid 26.

At the top wall of the case body 25, there is provided a battery connecting section 25e that can be electrically connected to a terminal section 35 of the tool battery 30 as the tool battery 30 is inserted into the case body 25. The battery connecting section 25e includes power source terminals for the television device 21. The power source terminals of the battery connecting section 25e are electrically connected to the television device 21 via an electric line (not shown), so that the battery connecting section 25e is electrically connected to the television device 21. Therefore, when the terminal section 35 of the tool battery 30 is electrically connected to the battery connecting section 25e, the terminal section 35 of the tool battery 30 is further electrically connected to the television device 21.

<Connecting Mechanism of Portable Television>

As shown in FIG. 3, the connecting mechanism 28 is configured to connect a lower corner portion on the side of a bottom of the case body 25 and a right lower corner portion of the rear surface of the television device 21. The connecting mechanism 28 includes a television-side protruding shaft 28x shown in FIGS. 1(A) to 1(C), a case-side protruding shaft 28y shown FIG. 3, and a rotary joint 280 shown in FIGS. 1(A) to 1(C). The television-side and case-side protruding shafts 28x and 28y are joined to the rotary joint 280. The television-side protruding shaft 28x protrudes horizontally and rightwardly from the right lower corner portion of the television device 21 and is rotatably supported by a first bearing portion 281 of the rotary joint 280. The case-side protruding shaft 28y protrudes horizontally forwardly from the lower corner portion on the bottom side of the case body 25 and is rotatably supported by a second bearing portion 282 of the rotary joint 280. The television side protruding shaft 28x and the case-side protruding shaft 28y extend perpendicular to each other.

Therefore, the television device 21 can rotate about an axis of the television-side protruding shaft 28x in order to change the inclination of the image display 22e. On the other hand, the battery case 24 can be pivoted between a horizontal position and a vertical position about an axis of the case-side protruding shaft 28y as shown in FIGS. 2(A) and 2(B).

<Rotation Lock Mechanism for Portable Television>

Figure 4A:
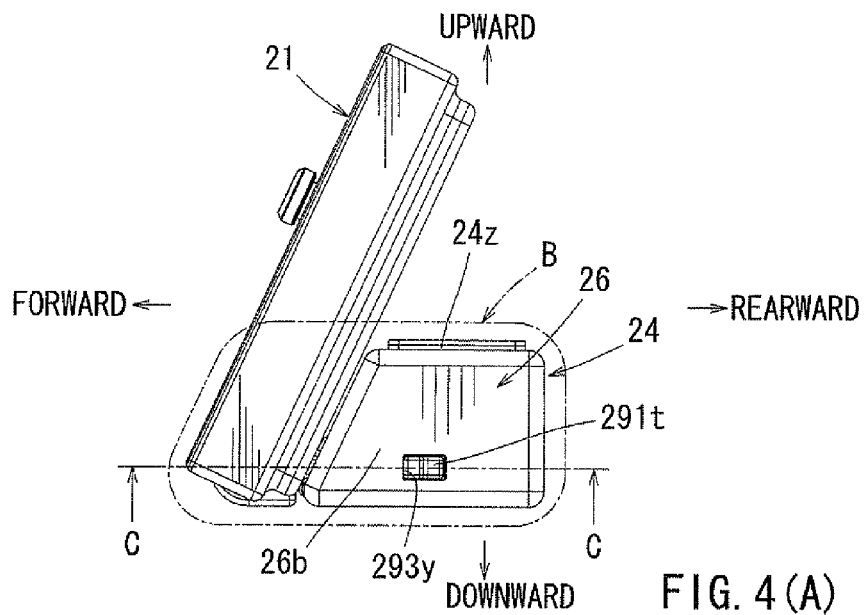
FIG. 4(A) is a left side view of the portable television system.
Figure 4B:
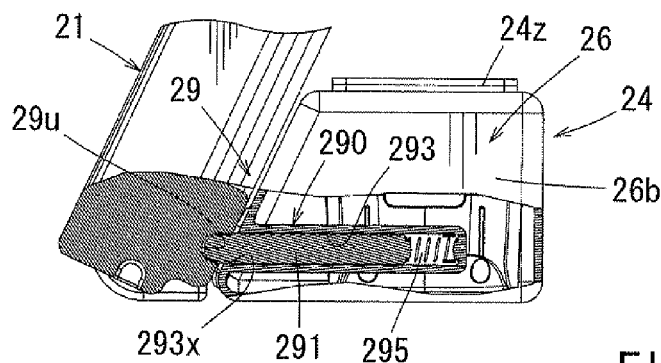
FIG. 4(B) is a left side view similar to FIG. 4(A) with a rotation lock mechanism shown in cross section.
Figure 4C:
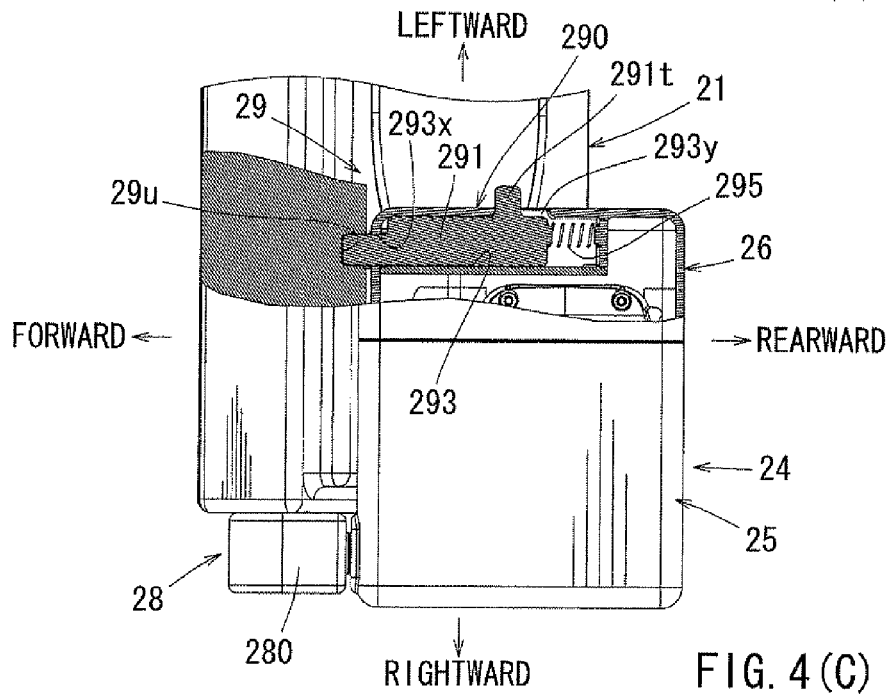
FIG. 4(C) is a plan view of a part of the portable television system with the rotation lock mechanism shown in cross section.
Figure 6A:
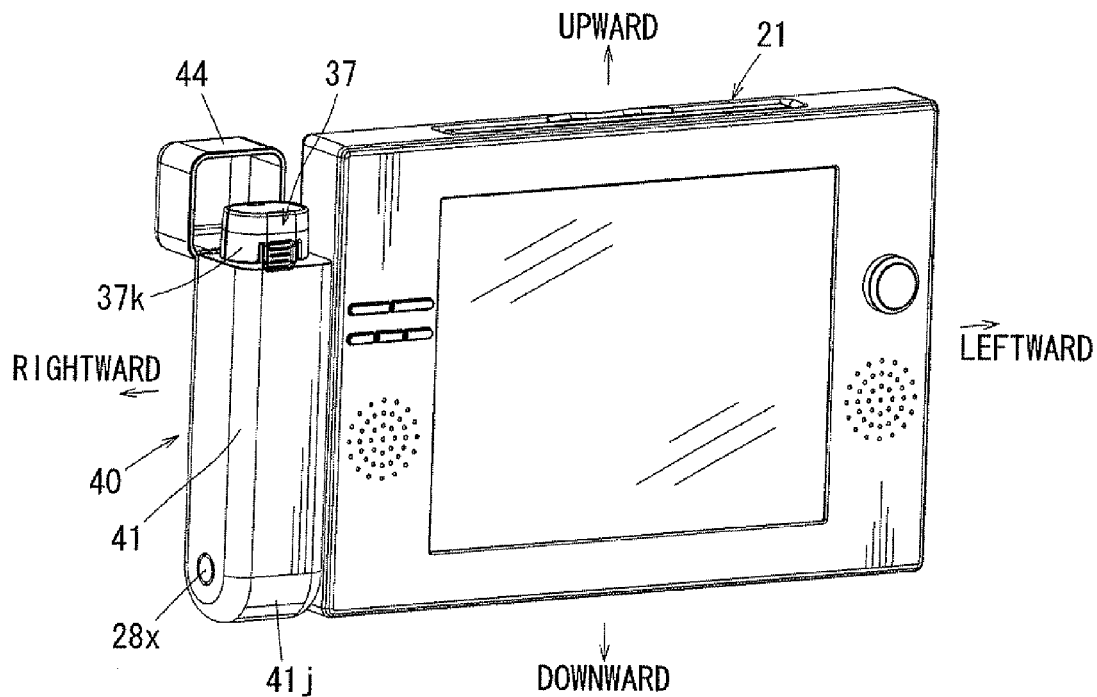
FIGS. 6(A) is a perspective view of an electric apparatus system configured as a portable television system according to a third example.
Figure 6B:
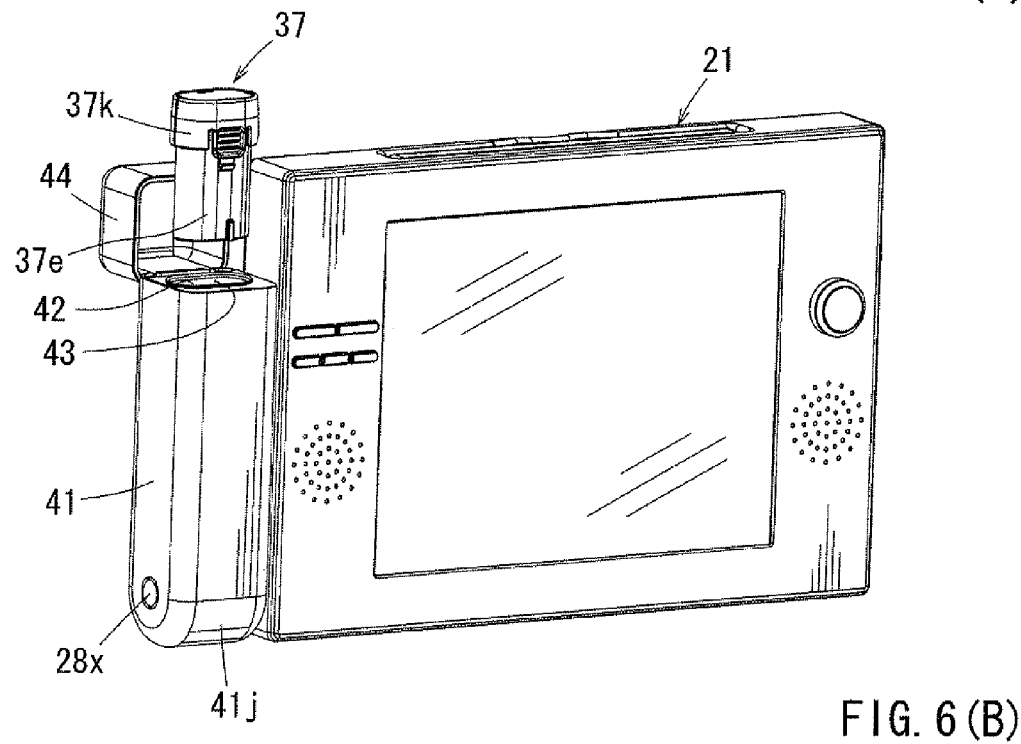
FIG. 6(B) is a perspective view similar to FIG. 6(A) but showing a state where a tool battery is removed from a battery case.
Figure 7:
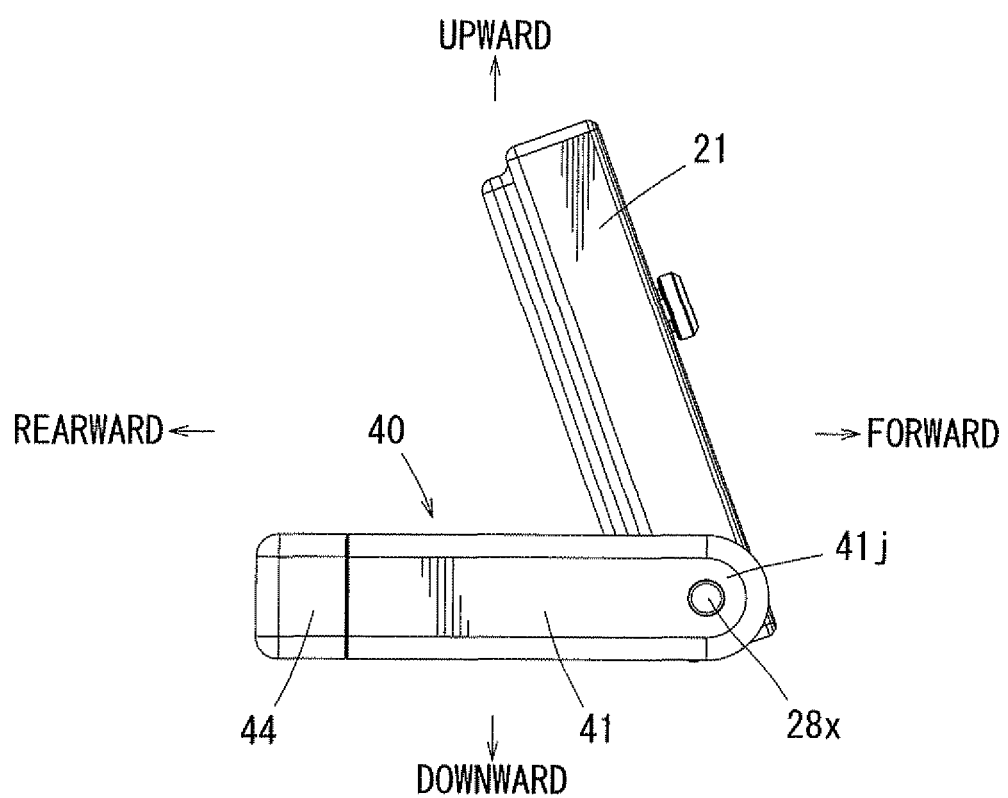
FIG. 7 is a side view of the portable television system.

The rotation lock mechanism 29 can prevent rotation of the battery case 24 relative to the television device 21 when the battery case 24 is positioned at the horizontal position. As shown in FIGS. 4(A), 4(B) and 4(C), the rotation lock mechanism 29 includes a lock pin device 290 provided at the lid 26 of the battery case 24 and a lock pin receiving recess 29u formed in the rear surface portion of the television device 21.

The lock pin device 290 includes a lock pin 291, a guide hole 293 axially slidably receiving the lock pin 291, and a spring 295 biasing the lock pin 291 in a direction of pushing the lock pin 291 (pressing forwardly) out of the guide hole 293.

The guide hole 293 is formed within a bottom plate 26b of the lid 26 and extends in the forward and rearward direction. The guide hole 293 is opened at a front opening 293x, so that a front end of the lock pin 291 protrudes outward from the guide hole 293 via the front opening 293x as shown in FIG. 4(C). The guide hole 293 is also opened at a lateral slot 293y formed in the bottom plate 26b. An operation lever 291t of the lock pin 291 protrudes laterally outwardly from the bottom plate 26b. The lateral slot 293y is elongated in the forward and rearward direction.

The lock pin 291 has a length that is substantially the same as the length (depth) of the guide hole 293. The width in the forward and rearward direction of the operation lever 291t protruding laterally from the lock pin 291 is set to be smaller enough than the length of the slot 293y.

With this arrangement, the lock pin 291 can move along the guide hole 293 within a range corresponding to a movable range of the operation lever 291t along the slot 293y. As describe previously, the lock pin 291 is pushed forwardly by the spring 295, and therefore, the operation lever 29 It is normally positioned at the front end of the slot 293y. In this state, the front end of the lock pin 291 protrudes from the front opening 293x of the guide hole 293 by a given distance.

When the operator pushes the operation lever291t rearwardly against the biasing force of the spring 295, the front end of the lock pin 291 retracts into the guide hole 293. In this state, the lock condition by the rotation lock mechanism 29 is released.

In the state that the battery case 24 is oriented horizontally as shown in FIGS. 4(B) and 4(C), the lock pin 291 of the lock pin device 290 can engage the lock pin receiving recess 29u formed in the rear surface portion of the television device 21, so that it is possible to prevent the battery casa 24 from rotating from the horizontal position to the vertical position relative to the television device 21. This lock condition can be released by pushing the operation lever 291t rearwardly as described above.

<Use of Portable Television System>

If a user wishes to watch movies or the like stored in the DVD disk by using the portable television system 10, the user first sets the tool battery 30 into the battery case 24 that is oriented horizontally as shown in FIG. 3. To this end, the user opens the lid 26 of the battery case 24 and inserts the tool battery 30 into the case body 25, so that the terminal section 35 of the tool battery 30 is connected to the battery connecting section 25e of the case body 25 by being fitted therewith. Therefore, the terminal section 35 of the tool battery 30 and the battery connecting section 25e of the case body 25 can be electrically and mechanically connected to each other. After closing the lid 26 of the battery case 24, the user releases the lock condition of the rotation lock mechanism 29 and pivots the battery case 24 to the vertical position while keeping the lock release condition. Subsequently, the user opens the insertion portion 22h formed in the rear surface portion of the television device 21 and inserts the DVD disk into the insertion portion 22h. Thereafter, the user pivots the battery case 24 to return from the vertical position to the horizontal position and tilts the television device 21 rearwardly, so that the front end portion of the lock pin 291 of the rotation lock mechanism 29 enters the lock pin receiving recess 29u formed in the rear surface portion of the television device 21. Therefore, the rotation lock mechanism 29 is brought to the lock condition for preventing the battery case 24 from pivoting toward the vertical position relative to the television device 21. Finally, in this state, the user can watch the movie or the like by operating the operation panel P of the television device 21.

In this way, the battery case 25 can be used as a support device for supporting the television device 21 and also as a stopper for preventing the television device 21 from tilting downward.

According to the portable television system 10 of this example, the battery case 24 for receiving the tool battery 30 is provided with the battery connecting section 25e having power source terminals connected to the television device 21, and the tool battery 30 can be electrically connected to and disconnected from the battery connecting section 25e. Therefore, the tool battery 30 can be electrically and mechanically connected to the television device 21 by simply inserting the tool battery 30 into the case body 24. In other words, the tool battery 30 can be used as a power source of the television device 21 that is an electric apparatus excluding a power tool.

In addition, the battery case 24 for storing the tool battery 30 is disposed on the rear side of the television device 21. Therefore, the battery case 24 can be used as a support for supporting the television device 21 or a stopper for preventing the television device 21 from tilting downward. Therefore, in comparison with a known structure including rods assembled into a rectangular frame surrounding the housing, the support mechanism for supporting the television device 21 can be simplified, and eventually, it is possible to reduce the size of the portable television system 10.

Further, when a DVD disk is inserted into or removed from the insertion portion 22h, it is possible to pivot the battery case 24 to the vertical position. Therefore, the battery case 24 may not interfere with the operations for inserting and removing the DVD disk.

Furthermore, when the rotation lock mechanism 29 is in the lock condition, the battery case 24 cannot rotate from the horizontal position (for supporting the television device 21) toward the vertical position. Therefore, it is possible to support the television device 21 in stable.

Furthermore, the battery case 24 is configured to support the television device 21 in the state that the television device 21 and its image display 22e are tilted rearwardly. Therefore, the user can easily look at a screen of the image display 22e.

Furthermore, the battery case 24 is provided with the seal member 27 that can seal the clearance that may be formed between the case body 25 and the lid 26. Therefore, it is possible to improve the waterproof property of the battery ease 24.

The above example may be modified in various ways. The second to fourth examples that are modifications of the first example will now be described with reference to FIGS. 5(A) and 5(B) to FIGS. 8(A) and 8(B). In these figures, like members are given the same reference signs as the first example, and the description of these members will now be repeated.

SECOND EXAMPLE

In the above first example, the connecting mechanism 28 has the television-side protruding shaft 28x, the case-side protruding shaft 28y and the rotary joint 280 to enable the battery case 24 to pivot between the horizontal position and the vertical position. In the second example shown in FIGS. 5(A) and 5(B), the case-side protruding shaft 28y of the battery ease 24 is fitted into a circular recess 28j formed in the rear surface portion of the television device 21 for rotatably receiving the case-side protruding shaft 28y, so that the battery case 24 is directly connected to the television device 21. In this case, as shown in FIG. 5(C), the case-side protruding shaft 28y includes a cylindrical tubular negative-side male terminal N1 and a needle-shaped positive-side male terminal P1 positioned centrally within the negative-side male terminal N1, so that the case-side protruding shaft 28y has a configuration like a round pin. On the other hand, within the circular recess 28j of the television device 21, there are provided a negative-side female teiniinal N0 for receiving the negative-side male terminal N1 and a positive side female terminal P0 for receiving the positive side male terminal P1.

With this arrangement, the negative-side and positive side male terminals P1 and P0 of the case-side protruding shaft 28y of the battery case 24 and the negative side and positive side female terminals N0 and P0 of the television device 21 serve as a connecting mechanism for mechanically and electrically connecting between the battery case 24 and the television device 21. In addition, the inner circumferential surface of the circular recess 28j also serves to rotatably support the case-side protruding shaft 28y. Therefore, it is not necessary to wire electric lines between the battery case 24 and the television device 21, for example by extending externally of these components or by extending through the connection mechanism 28 of the first example. As a result, no countermeasure is required for preventing potential breaking of the electric lines.

A seal member R is mounted to the inner circumference of the opening of the circular recess 28j of the television device 21. The seal member R seals between the case-side protruding shaft 28y and the inner circumference of at the opening of the circular recess 28j. The seal member R also seals between the battery case 24 and the rear surface of the television device 21. With this arrangement, it is possible to ensure a waterproof property of the connecting region between the television device 21 and the battery case 24.

THIRD EXAMPLE

Further, in the first example, the battery case 24 can rotate along the rear surface of the television device 21 between the horizontal position and the vertical position, and the terminal section 35 of the tool battery 30 is connected to the battery connecting section 25e disposed at the top wall of the case body 25. According to the third example shown in FIGS. 6(A) and 6(B), a tool battery 37 is used in combination with a battery case 40 that has a relatively small size. The tool battery 37 includes an insert portion 37e and a cover 37k. The insert portion 37e is configured to be capable of being inserted into an insertion hole formed in a grip portion of a power tool (not shown). The cover 37k is configured to close the opening of the insertion hole. Electrodes (not shown) are provided at the bottom end of the insert portion 37e.

The battery case 40 has a case body 41 and a cap 44. The case body 41 has a substantially rectangular tubular configuration and includes a battery receiving hole 43 configured to receive the insert portion 37e of the tool battery 37. The cap 44 is configured to be able to open and close the battery receiving hole 43. Within the battery receiving hole 43 of the case body 41, there are provided a battery connecting section (not shown) that is similar to the battery connecting section 25e of the first example. Thus, the battery connecting section has electrodes that are electrically connected to the television device 21 an can be electrically connected to the electrodes of the insert portion 37e of the tool battery 37 when the insert portion 37e of the tool battery 37 is inserted into the battery receiving hole 43 of the case body 41. Therefore, the tool battery 37 and the television device 21 can be electrically connected to each other. Further, the cap 44 is configured to be capable of covering a lid 37k of the tool battery 37. A seal member 42 is attached to the case body 41 at its end portion around the opening of the battery receiving hole 43 in order to seal between the case body 41 and the cap 44.

The case body 41 of the battery case 40 has a joint portion 41j disposed at one end of the case body 41 on the side opposite to the cap 44 and rotatably supporting the television-side protruding shaft 28x, so that the battery case 40 can pivot vertically between the horizontal position and the vertical position, while being positioned on the right side of the television device 21. In addition, when the battery case 40 is at the horizontal position shown in FIG. 7, the battery case 40 can support the television device 21 not to tilt downward.

FOURTH EXAMPLE

Figure 8A:
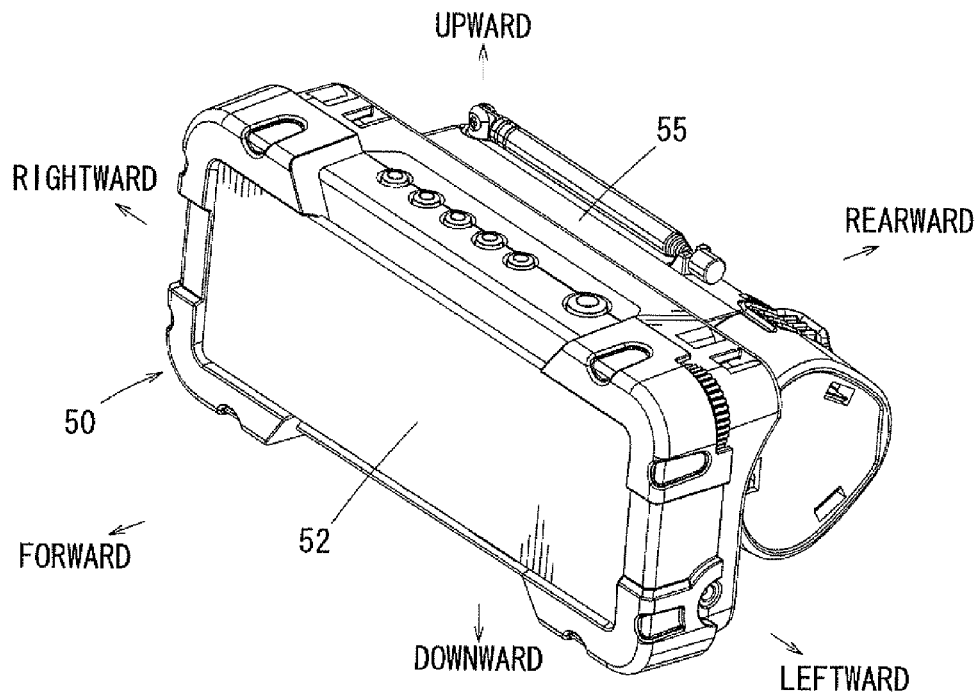
FIGS. 8(A) and 8(B) are perspective views of an electric apparatus system configured as a radio system according to a fourth example.
Figure 8B:
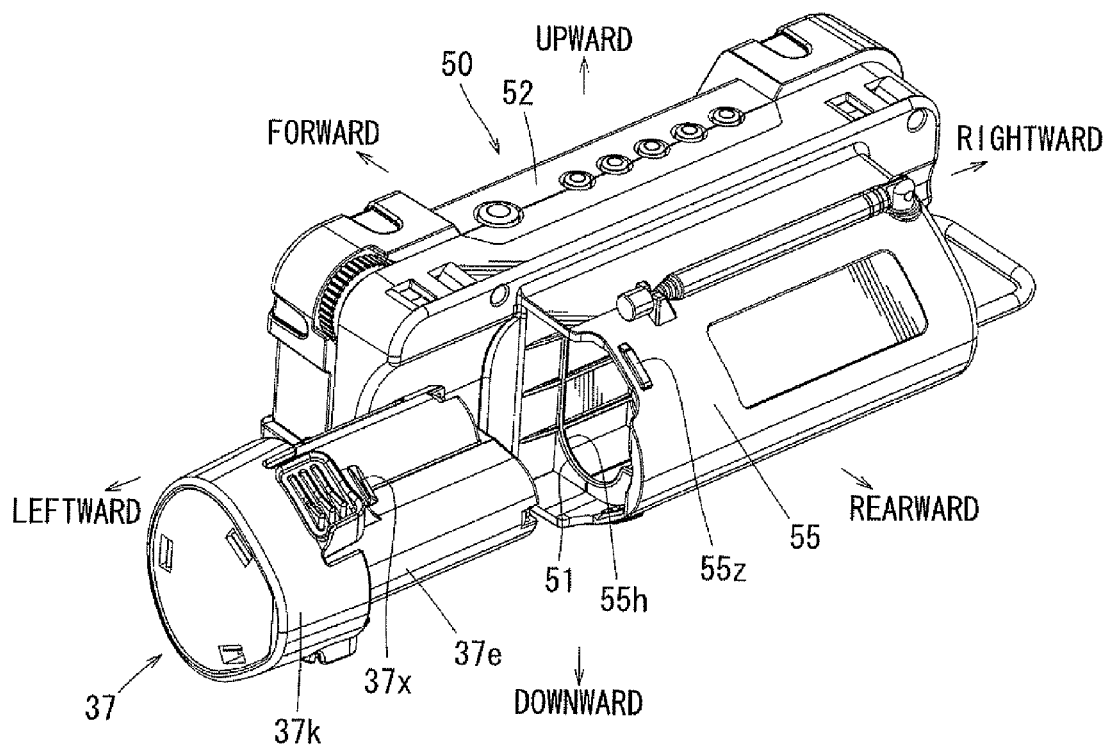

In the portable television system 10 (i.e., an electric apparatus system) of the first example, the television device 21 (i.e., an electric apparatus) and the battery case 40 are connected to each other by the connection mechanism 28. A fourth example shown in FIGS. 8(A) and 8(B) is configured as a radio system including a radio unit 50 (i.e., an electric apparatus) and a battery case 55. The radio unit 50 has a radio device 52 (i.e., an electric apparatus). The battery case 55 is integrated with the radio device 52 as a unit.

As shown in FIGS. 8(A) and 8(B), the battery case 55 is positioned on the rear side of the radio device 52 and supports the radio device 52 from the rear side. The battery case 55 is oriented horizontally and has a battery insertion opening 55h for receiving the tool battery 37. When the battery insert portion 37e is inserted into the battery case 55, the battery insertion opening 55h is closed by the lid 37k of the tool battery 37. Within the battery case 55, there is provided a battery connecting section similar to the battery connecting section 25e of the first example. Thus, the battery connecting section has electrodes that are electrically connected to the radio device 52 and can be electrically connected to the electrodes of the insert portion 37e of the tool battery 37. A hook portion 37x is formed on the lid 37k of the tool battery 37 and can be engaged with and disengaged from a hook receiving portion 55z formed on the battery case 55.

When the insert portion 37e of the tool battery 37 is inserted into the battery case 55 to reach a predetermined depth, the hook portion 37x of the tool battery 37 resiliently engages the hook receiving portion 55z of the battery case 55. Therefore, the tool battery 37 can be prevented from being removed from the battery case 55, and at the same time, the electrodes of the tool battery 37 are electrically connected to the corresponding electrodes of the battery connecting section, which are electrically connected to the radio device 52. Therefore, it is possible to use the radio unit 50.

The hook portion 37x of the tool battery 37 can be disengaged from the hook receiving portion 55z of the battery case 55 by pushing the hook portion 37x to cause its resilient deformation.

A seal member 51 is mounted to the inner circumference of the battery insertion opening 55h for sealing between the lid 37k and the battery case 55 when the tool battery 37 is connected to the battery ease 55.

OTHER POSSIBLE EXAMPLES

Although the portable television unit 20 and the radio unit 50 have been shown as examples of the electric apparatus excluding the power tool, the above teachings can be also applied to the other electric apparatus, such as a personal computer, a stereo, an image display devise including a DVD player and a blu-ray player, an electric air cleaner, an electric fan, etc.

What is claimed is:
1. An electric apparatus system comprising:
  a tool battery usable as a power source for a power tool;
  an electric apparatus excluding a power tool; and
  a battery case capable of receiving the tool battery, wherein:
    the battery case is disposed on a rear side of the electric apparatus and the electric apparatus is configured to tilt against the battery case such that the battery case supports the rear side of the electric apparatus while a rear side surface of the electric apparatus contacts a front side surface of the battery case:
    the battery case includes a connecting section electrically connected to the electric apparatus and disposed within the battery case;
    the connecting section can be electrically connected to and disconnected from the tool battery;
    the tool battery is configured to be interchangeably used between the power tool and the electric apparatus; and
    the battery case and the electric apparatus are configured separately from each other.
2. The electric apparatus system as in claim 1, wherein the electric apparatus has a front side, a rear side, a right side and a left side, and the battery case is disposed on one of the rear side, the left side and the right side.

3. The electric apparatus system as in claim 1, wherein:
  the electric apparatus is a reproducing device for reproducing data stored in a recording medium;
  the reproducing device includes a rear surface portion having an insertion portion for inserting the recording medium therein; and
  the battery case is rotatably connected to the reproducing device by the connection mechanism.
4. The electric apparatus system as in claim 3, further comprising a lock mechanism configured to prevent rotation of the battery case relative to the reproducing device when the battery case is positioned at a set position relative to the reproducing device.
5. The electric apparatus system as in claim 1, wherein the electric apparatus is an image display device having a screen, and the battery case is configured to support the image display device in a state that the screen is inclined relative to a vertical direction.
6. The electric apparatus system as in claim 1, wherein the round pin is provided on one of the battery case and the electric apparatus and a circular recess formed in the other of the battery case and the electric apparatus and rotatably receiving the round pin, and the round pin serves as power supply terminals and defines a center of rotation of the battery case.
7. The electric apparatus system as in claim 6, further comprising a seal member for sealing between the round pin and an inner circumference of the circular recess at an open end of the circular recess.
8. The electric apparatus system as in claim 1, wherein the battery case includes a case body, a lid and a seal member, the case body has a battery insertion opening, the lid can open and close the battery insertion opening of the case body, and the seal member can seal a joint portion between the case body and the lid.
9. The electric apparatus system as in claim 1, wherein:
  the battery case is configured as a container having a battery insertion opening,
  the tool battery includes an insert portion capable of inserting into the battery case via the battery insertion opening, a lid capable of opening and closing the battery insertion opening, and a hook portion provided at the lid and capable of engaging with and disengaging from a hook receiving portion provided at the battery case, and
  the battery case includes a seal member for sealing between the battery case and the lid of the tool battery at the battery insertion opening.
10. An electric apparatus system comprising:
  a tool battery usable as a power source for a power tool;
  an electric apparatus excluding a power tool; and
  a battery case capable of receiving the tool battery, wherein:
    the battery case is disposed on one side of the electric apparatus, and the electric apparatus is configured to tilt against the battery case so that the electric apparatus is stabilized in position by the battery case;
    the electric apparatus and the battery case are mechanically and electrically connected to each other;
    the tool battery is configured to be interchangeably used between the power tool and the electric apparatus;
    the battery case and the electric apparatus are configured separately from each other;
    the electric apparatus has a rear surface having a substantially rectangular shape and including upper right and left corner portions and lower right and left corner portions: and the battery case is pivotable between a horizontal position and a vertical position about an axis extending substantially perpendicular to the rear surface of the electric apparatus and located proximal to one of the lower and left corner portions of the rear surface, the battery case having a longitudinal axis extending substantially parallel to a lower edge of the rear surface when the battery case is positioned at the horizontal position.

11. The electric apparatus system as in claim 10, wherein the battery case protrudes horizontally from one side of the electric apparatus.

12. An electric apparatus system comprising:
a tool battery usable as a power source for a power tool;
an electric apparatus excluding a power tool; and
a battery case capable of receiving the tool battery, wherein:
the electric apparatus and the battery case are mechanically and electrically connected to each other;
the battery case can pivot relative to the electric apparatus and the electric apparatus is configured to tilt against the battery case such that the battery case supports the electric apparatus;
the tool battery is configured to be interchangeably used between the power tool and the electric apparatus;
the battery case and the electric apparatus are configured separately from each other and are connected to each other by a connection mechanism that includes a round pin that electrically connects the battery case to the electric apparatus;
the electric apparatus has a rear surface having a substantially rectangular shape and including upper right and left corner portions and lower right and left corner portions;
the connection mechanism is located proximal to one of the lower and left corner portions of the rear surface;
the connection mechanism is configured to allow pivotal movement of the battery case about a pivotal axis that is substantially perpendicular to the rear surface of the electric apparatus; and
the connection mechanism is configured to allow removal of the battery case from the rear surface of the electric apparatus in a direction parallel to the pivotal axis.

13. The electric apparatus system as in claim 12, wherein the battery case can vertically pivot relative to the electric apparatus.

14. An electric apparatus system comprising:
a tool battery usable as a power source for a power tool;
an electric apparatus excluding a power tool; and
a battery case capable of receiving the tool battery, wherein:
the battery case is disposed on one side of the electric apparatus;
the battery case includes a connecting section electrically connected to the electric apparatus and disposed within the battery case,
the connecting section can be electrically connected to and disconnected from the tool battery;
the battery is configured to be interchangeably used between the power tool and the electric apparatus;
the battery case and the electric apparatus are configured separately from each other and are connected to each other by a connection mechanism;
the battery case includes a case body and a lid, the case body having a battery insertion opening, and the lid being configured to close the battery insertion opening;
the case body has a first end portion and a second end portion on opposite sides with respect to a longitudinal direction, the first end portion having the battery insertion opening,
the connection mechanism includes a connection shaft that rotatably connect the second end portion of the case body to the electric apparatus;
the longitudinal direction of the case body and an axial direction of the connection shaft are substantially perpendicular to each other;
the electric apparatus has a rear surface having a substantially rectangular shape and including upper right and left corner portions and lower right and left corner portions; and
the connection shaft is located proximal to one of the lower right and left corner portions of the rear surface of the electric apparatus.

15. The electric apparatus system as in claim 14, wherein the electric apparatus has a front side, a rear side, a right side and a left side, and the battery case is disposed on one of the rear side, the left side and the right side.

16. The electric apparatus system as in claim 14, wherein:
the electric apparatus is a reproducing device for reproducing data stored in a recording medium;
the reproducing device includes a rear surface portion having an insertion portion for inserting the recording media therein; and
the battery case is rotatably connected to the reproducing device by the connection mechanism.

17. The electric apparatus system as in claim 16, further comprising a lock mechanism configured to prevent rotation of the battery case relative to the reproducing device when the battery case is positioned at a set position relative to the reproducing device.

18. The electric apparatus system as in claim 14, wherein the electric apparatus is an image display device having a screen, and the battery case is configured to support the image display device in the state that the screen is inclined relative to a vertical direction.

19. The electric apparatus system as in claim 14, wherein the connection mechanism for connecting between the battery case and the electric apparatus includes a round pin provided on one of the battery case and the electric apparatus and a circular recess formed in the other of the battery case and the electric apparatus and rotatably receiving the round pin, and the round pin serves as power supply terminals and defines a center of rotation of the battery case.

20. The electric apparatus system as in claim 19, further comprising a seal member for sealing between the round pin and the inner circumference of the circular recess at an open end of the circular recess.

21. The electric apparatus system as in claim 14, wherein the battery case includes a case body, a lid and a seal member, the case body has a battery insertion opening, the lid can open and close the battery insertion opening of the case body, and the seal member can seal a joint portion between the case body and the lid.

22. The electric apparatus system as in claim 14, wherein:
the battery case is configured as a container having a battery insertion opening,
the tool battery includes an insert portion capable of inserting into the battery case via the battery insertion opening, a lid capable of opening and closing the battery insertion opening, and a hook portion provided at the lid and capable of engaging with and disengaging from a hook receiving portion provided at the battery case, and the battery case includes a seal member for sealing between the battery case and the lid of the tool battery at the battery insertion opening.

23. The electric apparatus system as in claim 14, wherein the cover is connected to the first end portion of the case body via a hinge, so that the cover is pivotable about an axis substantially parallel to the connecting shaft.

24. An electric apparatus system comprising:
a tool battery usable as a power source for a power tool;
an electric apparatus excluding a power tool; and
a battery case capable of receiving the tool battery, wherein:
the battery case is disposed on one side of the electric apparatus;
the battery case includes a connecting section electrically connected to the electric apparatus and disposed within the battery case,
the connecting section can be electrically connected to and disconnected from the tool battery;
the battery is configured to be interchangeably used between the power tool and the electric apparatus;
the battery case includes a case body having a battery insertion opening;
the case body has a first end portion and a second end portion on opposite sides with respect to a longitudinal direction, the first end portion having the battery insertion opening, the tool battery includes a lid configured to close the battery insertion opening when the tool battery is inserted into the case body via the battery insertion opening;

a lock device is provided between the tool battery and the case body and is configured to releasably lock the tool battery against the case body when the tool battery is inserted into the case body;

the case body of the battery case is integrated with the electric apparatus:

the electric apparatus has a longitudinal axis; and the case body of the battery case is configured such that the tool battery is inserted into the case body via the battery insertion Opening in a direction parallel to the longitudinal axis of the electric apparatus.

25. The electric apparatus system as in claim 24, wherein the lock device comprises:
a hook portion disposed at the lid; and
a hook receiving portion disposed at the case boy and engageable with the hook portion.

26. The electric apparatus system as in claim 24, wherein:
the lid is integrated with the tool battery;
the tool battery further includes a battery insertion portion located within the case body when the tool battery is inserted into the case body; and
the lid is exposed to the outside of the case body when the tool battery is inserted into the case body.

27. The electric apparatus system as in claim 1, wherein the battery case and the electric apparatus are connected to each other by a connection mechanism that includes a round pin that electrically connects the battery case to the electric apparatus.

* * * * *